United States Patent
Ishii

(10) Patent No.: US 9,836,662 B2
(45) Date of Patent: Dec. 5, 2017

(54) AUTHENTICATION DEVICE, AUTHENTICATION METHOD AND PROGRAM STORAGE MEDIUM

(71) Applicant: NEC Corporation, Minato-ku, Tokyo (JP)

(72) Inventor: Masato Ishii, Tokyo (JP)

(73) Assignee: NEC CORPORATION, Tokyo (JP)

(*) Notice: Subject to any disclaimer, the term of this patent is extended or adjusted under 35 U.S.C. 154(b) by 17 days.

(21) Appl. No.: 14/769,532

(22) PCT Filed: Feb. 5, 2014

(86) PCT No.: PCT/JP2014/000610
§ 371 (c)(1),
(2) Date: Aug. 21, 2015

(87) PCT Pub. No.: WO2014/132570
PCT Pub. Date: Sep. 4, 2014

(65) Prior Publication Data
US 2015/0371098 A1    Dec. 24, 2015

(30) Foreign Application Priority Data
Feb. 26, 2013 (JP) ................ 2013-035780

(51) Int. Cl.
*G06K 9/00* (2006.01)
*G05B 19/00* (2006.01)
(Continued)

(52) U.S. Cl.
CPC ......... *G06K 9/00892* (2013.01); *G06F 21/32* (2013.01)

(58) Field of Classification Search
CPC ........... G06K 9/00892; G06K 9/00885; G06K 2009/00932; G06F 21/32; G07C 9/00158; G07C 9/00087
(Continued)

(56) References Cited

U.S. PATENT DOCUMENTS 7,725,732 B1* 5/2010 Ballard ................ H04L 9/3231
                                                    713/186
7,804,982 B2* 9/2010 Howard ............ G06F 17/30011
                                                    382/115
(Continued)

FOREIGN PATENT DOCUMENTS

JP    2000-242786 A    9/2000
JP      3926059 B2    11/2000
(Continued)

OTHER PUBLICATIONS

International Search Report for PCT Application No. PCT/JP2014/000610, dated Apr. 15, 2014.
(Continued)

*Primary Examiner* — Sheela C Chawan

(57) ABSTRACT

The purpose of the present invention is to prevent a reduction in authentication accuracy caused by identity fraud. A score calculation unit compares each of a plurality of types of biological information, acquired as acquired biological information from a target person of identity verification, to the same type of registered biological information registered in advance. Based on the comparison, the score calculation unit calculates an authentication score that expresses the degree of similarity between the acquired biological information and the registered information, for each type of acquired biological information. For each type of the acquired biological information, a probability calculation unit calculates as an identity fraud probability using the calculated authentication score to. A determination unit
(Continued)

determines whether the target person of identity verification is the registered person, and/or determines whether the target person of identity verification is fraudulently pretending to be the registered person.

7 Claims, 6 Drawing Sheets

(51) Int. Cl.
  *G06F 21/00* (2013.01)
  *G06F 21/32* (2013.01)
(58) Field of Classification Search
  USPC ........ 382/100, 115, 118; 713/186, 185, 176, 713/150, 168, 182, 156, 175; 340/5.1, 340/5.2, 5.8, 5.81, 5.82; 726/2, 3, 5, 6, 726/7; 235/375, 380, 382
  See application file for complete search history.

(56) References Cited

U.S. PATENT DOCUMENTS

| 7,849,029 | B2* | 12/2010 | Crooks | G06Q 20/40 706/20 |
| 8,095,974 | B2* | 1/2012 | Aaron | G06F 21/35 235/380 |

FOREIGN PATENT DOCUMENTS

| JP | 2009-289253 A | 12/2009 |
| JP | 2010-108074 A | 5/2010 |
| WO | 2011/062096 A1 | 5/2011 |

OTHER PUBLICATIONS

English translation of Written opinion for PCT Application No. PCT/JP2014/000610.
N. Poh, T. Bourlai, J. Kittler, L. Allano, F. Alonso-Fernandez, O. Ambekar, J. Baker, B. Dorizzi, O. Fatukasi, J. Fierrez, H. Ganster, J. Ortega-Garcia, D. Maurer, A. A. Salah, T. Scheidat and C. Vielhauer, "Benchmarking quality-dependent and cost-sensitive score-level multimodal biometric fusion", IEEE Transactions on Information Forensics and Security, 4, 4, pp. 849 to 866 (2009).
"Evaluation of Biometric Spoofing in a Multimodal System" in Proceedings of the IEEE International Conference on Biometrics: Theory, Applications and Systems, 2010.
"Spoof Attacks on Multimodal Biometric Systems" in Proceedings of International Conference on Information and Technology, 2011.
K. Nandakumar, Y. Chen, S. C. Dass and A. K. Jain, "Likelihood ratio-based biometric score fusion", IEEE Transactions on Pattern Analysis and Machine Intelligence, 30, 2, pp. 342 to 347 (2008).
Kenta Takahashi, "Multimodal Biometrics Authentication", Image Lab, Jul. 1, 2003, vol. 14, No. 7, p. 64-67.
Takuya Nakamura et al., "Wolf Attack Against Multimodal Biometrics Authentication", 2011, Symposium on Cryptography and Information Security SCIS2011 [CD-ROM], Dec. 5, 2011, p. 1-8.
Takao Murakami, Kenta Takahashi, "Accuracy Improvement of Biometric Identification Using Multihypothesis Sequential Probability Ratio Test", Computer Security Symposium 2008 Collected papers [2nd tome], Oct. 8, 2008, vol. 2008, No. 8, p. 689-694, English Abstract.
Takashi Shinonaga et al., "Study on Vulnerability of Quality-Based Fusion Schemes", 2011, Symposium on Cryptography and Information Security SCIS2011 [CD-ROM], Jan. 25, 2011, p. 1-7.
Japanese Office Action for JP Application No. 2015-502739 dated May 23, 2017 with English Translation.

* cited by examiner

AUTHENTICATION DEVICE, AUTHENTICATION METHOD AND PROGRAM STORAGE MEDIUM

This application is a National Stage Entry of PCT/JP2014/000610 filed on Feb. 5, 2014, which claims priority from Japanese Patent Application 2013-035780 filed on Feb. 26, 2013, the contents of all of which are incorporated herein by reference, in their entirety.

TECHNICAL FIELD

The present invention relates to an authentication technique utilizing biological information.

BACKGROUND ART

Biometric authentication is one of authentication techniques. The biometric authentication is an authentication utilizing biological information (information enabling identifying individuals by one's body or behavior). For example, when the biological information in a target person of identity verification (a person whose identity is to be confirmed) is inputted, an authentication device which performs the biometric authentication compares the inputted biological information with a registered biological information preliminarily registered. The authentication device determines that the target person of identity verification is an actual person who is registered the registered biological information in the case the inputted biological information matches or closely resembles the registered biological information. On the other hand, in the case the inputted biological information does not resemble the registered biological information, the authentication device determines the target person of identity verification is not the person who registered the biological information.

The biometric authentication types include unimodal authentication and multimodal authentication. The unimodal authentication is an authentication method using one biological information in a target person of identity verification. The multimodal authentication is an authentication method using multiple types of biological information in a target person of identity verification. An example of a method of performing the multimodal authentication is shown in NPL1. In the method shown in NPL1, the authentication device calculates a score for each type of inputted biological information based on the comparison between the inputted multiple types of biological information and the registered biological information. Then, the authentication device determines whether the target person of identity verification is the registered person based on an integrated score that is an integration of the calculated scores.

Since such multimodal authentication utilizes more biological information than unimodal authentication, a highly precise authentication (in other words, an authentication whose authentication result is highly reliable) is said to be possible.

CITATION LIST

Non Patent Literature

[NPL1] N. Poh, T. Bourlai, J. Kittler, L. Allano, F. Alonso-Fernandez, O. Ambekar, J. Baker, B. Dorizzi, O. Fatukasi, J. Fierrez, H. Ganster, J. Ortega-Garcia, D. Maurer, A. A. Salah, T. Scheidat and C. Vielhauer, "Benchmarking quality-dependent and cost-sensitive score-level multimodal biometric fusion", IEEE Transactions on Information Forensics and Security, 4, 4, pp. 849 to 866 (2009)

[NPL2] "Evaluation of Biometric Spoofing in a Multimodal System" in Proceedings of the IEEE International Conference on Biometrics: Theory, Applications and Systems, 2010

[NPL3] "Spoof Attacks on Multimodal Biometric Systems" in Proceedings of International Conference on Information and Network Technology, 2011

SUMMARY OF INVENTION

Technical Problem

However, problems due to identity fraud (identity fraud problems) in multimodal authentication are reported in NPL2 and NPL3. The identity fraud problems occur even if one of the biological information is a biological information of fraudulently pretending (in other words, biological information resembling the registered person's biological information) and other biological information is biological information of some other person than the registered person. Thus, the authentication device causes the identity fraud problem (erroneous determination caused by the identity fraud) that the authentication device determines the target as registered person even if one is not, when only one of the biological information among the plurality of types of biological information is the biological information of fraudulently pretending. Consequently the authentication accuracy of the authentication device greatly decreases.

The present invention is developed to solve the above problem. More specifically, the main object of the present invention is to provide a technique that can suppress the authentication precision decrease caused by the biological information of fraudulently pretending in multimodal authentication.

Solution to Problem

In order to achieve the above object, an authentication device of the present invention includes:

a score calculation unit that compares multiple types of biological information acquired from a target person of identity verification as acquired biological information with the same type of registered biological information preliminarily registered and calculates an authentication score representing a degree of similarity between the acquired biological information and the registered biological information, for each type of the acquired biological information;

a probability calculation unit that calculates, for each type of the acquired biological information, a probability that the target person of identity verification is fraudulently pretending to be the registered person who registered the registered biological information as an identity fraud probability, by utilizing the calculated authentication score; and a determination unit that carries out at least one of a determination whether the target person of identity verification is the registered person and a determination whether the target person of identity verification is fraudulently pretending to be the registered person, utilizing the identity fraud probability.

An authentication method includes:

comparing multiple types of biological information acquired from a target person of identity verification as acquired biological information with the same type of registered biological information preliminarily registered;

calculating, for each type of the acquired biological information, an authentication score representing a degree of similarity between the acquired biological information and the registered biological information based on the comparison result;

calculating, for each type of the acquired biological information, a probability that the target person of identity verification is fraudulently pretending to be a registered person who registered the registered biological information as an identity fraud probability, utilizing the calculated authentication score; and carrying out at least one of a determination whether the target person of identity verification is the registered person and a determination whether the target person of identity verification is fraudulently pretending to be the registered person, utilizing the identity fraud probability.

A non-transitory computer-readable recording medium recorded with a program that causes a computer to execute:

a process of comparing multiple types of biological information acquired from a target person of identity verification as acquired biological information with same type of registered biological information preliminarily registered;

a process of calculating, for each type of the acquired biological information, an authentication score that represents a degree of similarity of the acquired biological information and the registered information based on the comparison result;

a process of calculating, for each type of the acquired biological information, a probability that the target person of identity verification is fraudulently pretending to be a registered person who registered the registered biological information as an identity fraud probability utilizing the authentication score; and a process of carrying out at least one of a determination whether the target person of identity verification is the registered person and a determination whether the target person of identity verification is fraudulently pretending to be the registered person, utilizing the identity fraud probability.

The main object of the present invention is also realized with the authentication method related to the authentication device with the above configuration. The main object of the present invention is also realized with the computer program realizing the above authentication device and the authentication method related to the authentication device by computer and a program storage medium storing it.

Advantageous Effects of Invention

The present invention allows to suppress the authentication precision decrease caused by biological information of fraudulently pretending.

DESCRIPTION OF EMBODIMENTS

The exemplary embodiments related to the present invention will be described below with reference to the Drawings.
<First Exemplary Embodiment>

Figure 1:
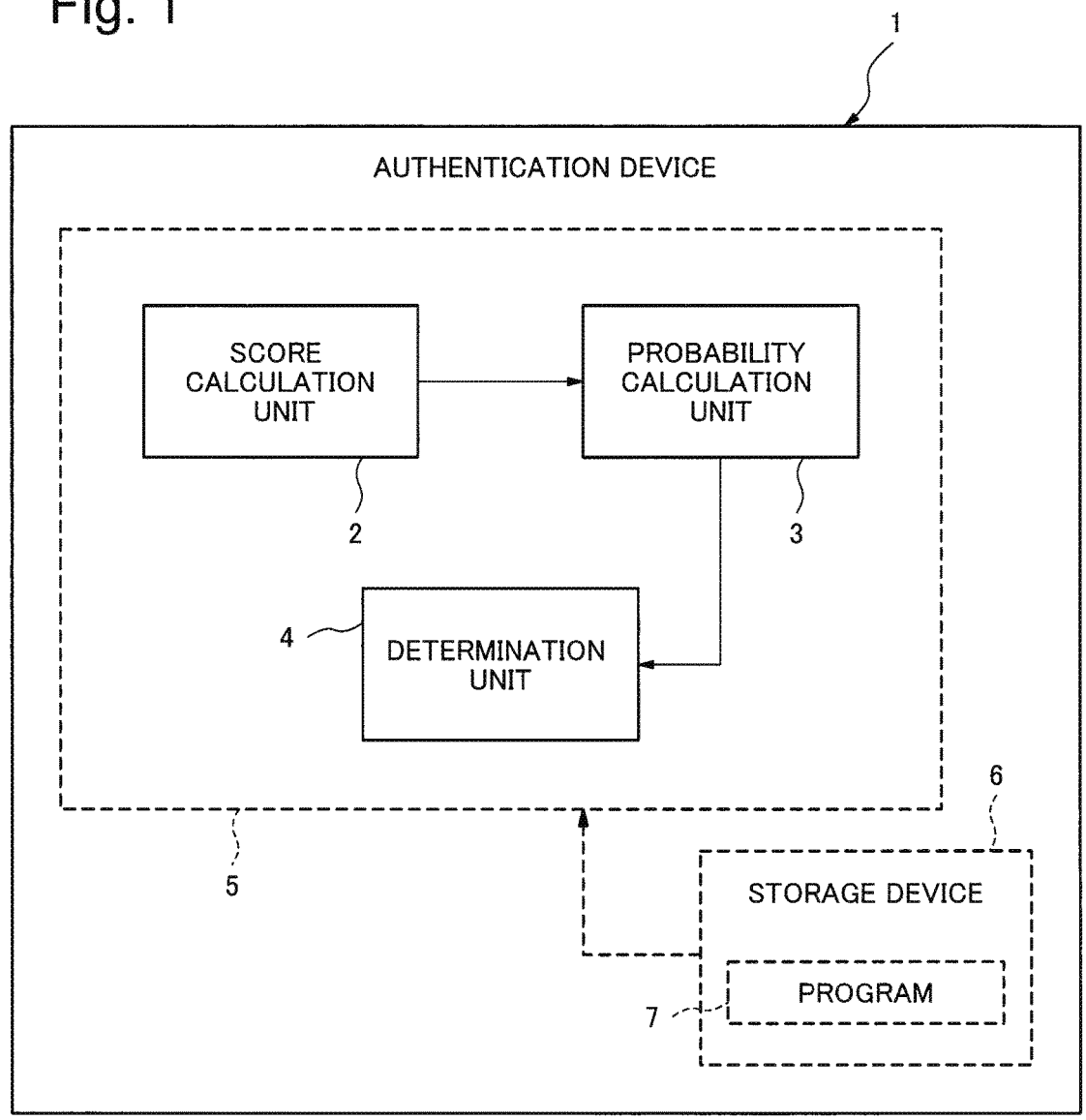
FIG. 1 is a block diagram showing in a simplified manner a configuration of an authentication device in a first exemplary embodiment related to the present invention.

FIG. 1 is a block diagram describing in a simplified manner a configuration of an authentication device in a first exemplary embodiment related to the present invention. The authentication device 1 of the first exemplary embodiment is an authentication device utilizing a multimodal authentication technique. The authentication device 1 has a score calculation unit (score calculation means) 2, a probability calculation unit (probability calculation means) 3 and a determination unit (determination means) 4.

The score calculation unit 2 has a function to compare a plurality of types of biological information acquired as acquired biological information from a target person of identity verification (a person whose identity is to be confirmed) respectively with the same type of biological information that is preliminarily registered. Utilizing the comparison, the score calculation unit 2 also has a function to calculate an authentication score representing a degree of similarity of the acquired biological information and the registered biological information for each type of the acquired biological information.

The probability calculation unit 3 has a function to calculate, as an identity fraud (spoofing) probability, a probability that the target person of identity verification is fraudulently pretending to be a registered person (a person who registered the registered biological information), for each type of the acquired biological information, by utilizing the calculated authentication score.

The determination unit 4 has a function to carry out at least one of following determinations, utilizing the calculated identity fraud probability. The one is the determination whether the target person of identity verification is the registered person. the other is the determination whether the target person of identity verification is fraudulently pretending to be the registered person.

For example, the authentication device 1 of the first exemplary embodiment is a computer device, and the score calculation unit 2, the probability calculation unit 3 and the determination unit 4 are realized by a control device 5 having a CPU (central processing unit). Thus, the authentication device 1 has a storage device 6 shown with a dotted line in FIG. 1, and the storage device 6 stores a computer program (hereinafter also referred to as a program) 7 that controls operation of the authentication device 1. The control device 5 realizes each function of the score calculation unit 2, the probability calculation unit 3 and the determination unit 4 by reading out the program 7 from the storage device 6 and operating according to the program 7. Thus, the program 7 has a computer program that permits the computer (control device 5) to execute the process of realizing each function of the score calculation unit 2, the probability calculation unit 3, and the determination unit 4.

The authentication device 1 of the first exemplary embodiment has the function to calculate the authentication score utilizing the acquired biological information and the registered biological information, and calculate the identity fraud probability (a probability that the target person of identity verification is fraudulently pretending to be a registered person) based on the authentication score. Moreover, the authentication device 1 has the function to perform the determination related to the authentication utilizing the identity fraud probability. In other words, the authentication device 1 calculates explicitly (expressly) the probability that the acquired biological information is the biological information of fraudulently pretending and resembling the biological information of the registered person, and utilizes the probability for determination related to the authentication. Therefore, the authentication device 1 of the first exemplary embodiment can suppress a situation that the target person of identity verification is erroneously determined as the registered person in the case the target person of identity verification is not the registered person because of the biological information of fraudulently pretending. Thus, the authentication device 1 of the first exemplary embodiment can increase the authentication accuracy, and can increase the reliability to the authentication determination.

<Second Exemplary Embodiment>

A second exemplary embodiment related to the present invention is described below.

Figure 2:
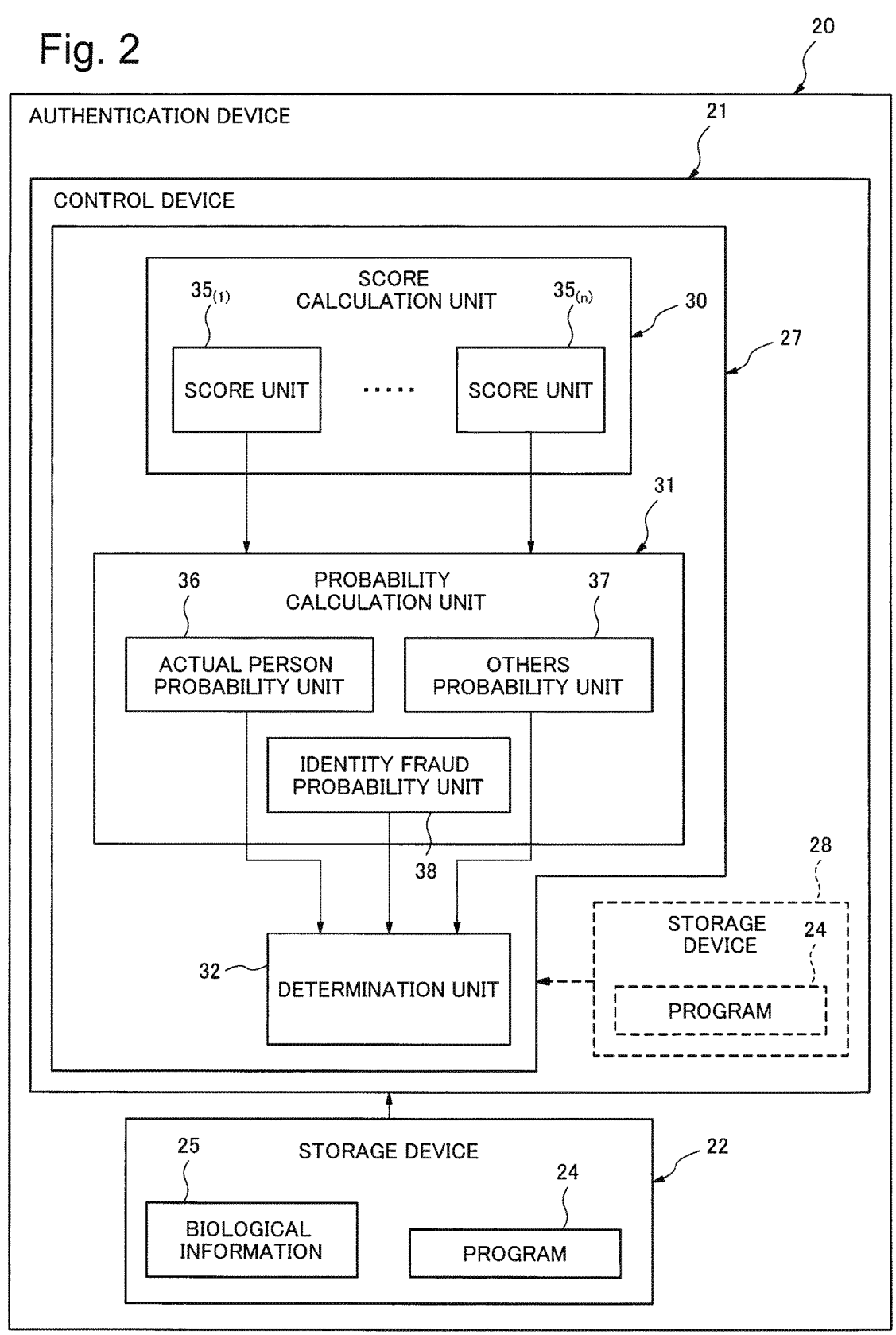
FIG. 2 is a block diagram showing in a simplified manner a configuration of an authentication device in a second exemplary embodiment related to the present invention.

FIG. 2 is a block diagram expressing in a simplified manner a configuration of an authentication device in the second exemplary embodiment. The authentication device 20 of the second exemplary embodiment is a device that performs the authentication determination of a target person of identity verification utilizing the multimodal authentication technique. The authentication device 20 has a control device 21 and a storage device 22. The storage device 22 is a device having a storage medium to store various data and programs. In the storage device 22, biological information 25 utilized in the authentication determination of the registered person (the person who is determined as OK in the authentication) is stored (registered) as registered biological information. Here, the biological information is information that enables identifying an individual such as a face image, an iris image, a fingerprint image, and a vein image of a finger or a palm. Since this authentication device 20 of the second exemplary embodiment utilizes the multimodal authentication technique, in the storage device 22, multiple types of biological information (registered biological information) 25 is stored per one registered person. In other words, multiple types of biological information 25 is related to identification information of one registered person and stored in the storage device 22. A program 24 to control operation of the authentication device 20 is stored in the storage device 22. The program 24 to control the operation of the authentication device 20 may be stored in a storage device 28 mounted within the control device 21, not in the storage device 22.

The control device 21 has a processing unit (processing means) 27 with a CPU. The processing unit 27 reads out the program 24 and operates according to the program 24, and realizes the following function. Therefore, the processing unit 27 has, as function units, a score calculation unit (score calculation means) 30, a probability calculation unit (probability calculation means) 31 and a determination unit (determination means) 32.

The score calculation unit 30 has a function to calculate the authentication score. The authentication score is a numerical value expressing the degree of similarity of the biological information acquired from the target person of identity verification (acquired biological information) and the biological information 25 of the registered person who is considered to be the same person as the target person of identity verification (registered biological information). In this second exemplary embodiment, the authentication score is higher when the degree of similarity is higher.

In this second exemplary embodiment, since the authentication device 20 utilizes the multimodal authentication technique, it acquires multiple types of biological information from the target person of identity verification. Taking this into consideration, in this second exemplary embodiment, the score calculation unit 30 has a plurality of score units $35_{(1)}, \ldots, 35_{(n)}$ (here, n is an integer equal to or more than 2) depending on the types of acquired biological information. Each score unit $35_{(1)}, \ldots, 35_{(n)}$ has a function to compare the similar type of the acquired biological information and the registered biological information, and calculate authentication scores for each type of the acquired biological information based on the comparison.

Various methods are proposed as authentication score calculation methods, and any method may be adopted here. For example, in the case the acquired biological information is a face image, the score calculation unit 30 (score unit 35) can calculate the authentication score utilizing a technique mentioned in Japanese Patent No. 3926059.

The probability calculation unit 31 has an actual person probability unit (actual person probability means) 36, an others probability unit (others probability means) 37 and an identity fraud probability unit (identity fraud probability means) 38.

The actual person probability unit 36 has a function to calculate an actual person probability using authentication scores calculated by the score calculation unit 30. The actual person probability is a probability that the target person of identity verification is an identical person as the registered person (a person who is authenticated as OK) who registered the biological information 25. The actual person probability unit 36 calculates the actual person probability f(s) according to an equation (1), for example.

$$f(s) = p(f) \prod_{i=1}^{n} f_i(s_i) \tag{1}$$

In the equation (1), $s=\{s_1, \ldots, s_n\}$ are n (n is an integer equal to or greater than 2) authentication scores calculated by the score units $35_{(1)}, \ldots, 35_{(n)}$. Each authentication score $s_1, \ldots, s_n$ is independent. The actual person probability distributions related in each authentication score are $\{f_1(s_1), \ldots, f_n(s_n)\}$. Moreover, p(f) represents a prior probability of the actual person. The prior probability p(f) and the actual person probability distribution are determined preliminarily as described in the below reference document, and given to the equation (1) as constants. Alternatively, the prior probability of the actual person p(f) and the actual person probability distributions can be determined adaptively as described in JP2010-108074 A, and given to the equation (1) depending on the situation. Therefore, the prior probability of actual person p(f) and the actual person probability distributions are determined using a method chosen considering a processing ability of the control device, authentication precision required by the specification or the like.

REFERENCE DOCUMENT

K. Nandakumar, Y. Chen, S. C. Dass and A. K. Jain, "Likelihood ratio-based biometric score fusion", IEEE Transactions on Pattern Analysis and Machine Intelligence, 30, 2, pp. 342 to 347 (2008)

The others probability unit 37 has a function to calculate a others probability utilizing the authentication score calculated by the score calculation unit 30. A others probability is a probability that the target person of identity verification is others (not an actual person), not the registered person. The others probability unit 37 calculates the others probability g(s) based on an equation (2), for example.

$$g(s) = p(g) \prod_{i=1}^{n} g_i(s_i) \qquad (2)$$

In the equation (2), similarly to the equation (1), n authentication scores (n is an integer equal to or greater than 2) calculated by the score units $35_{(1)}, \ldots, 35_{(n)}$ are $s=\{s_1, \ldots, s_n\}$, and each authentication score $s_1, \ldots, s_n$ is independent. Others probability distributions related in each authentication score are $\{g_1(s_1), \ldots, g_n(s_n)\}$. Moreover, p(g) represents a prior probability of others. For example, the prior probability of others p(g) and the others probability distributions are calculated preliminarily as shown in the above reference document, and given to the equation (2) as constants. Alternatively, the prior probability of others p(g) and the others probability distribution can be determined adaptively as described in JP2010-108074 A, and given to the equation (2) depending on the situation. That is, the prior probability of others p(g) and the others probability distributions are determined using a method chosen considering the processing ability of the control device, the authentication precision required by the specification or the like.

The identity fraud probability unit 38 has a function to calculate an identity fraud probability utilizing the authentication score calculated by the score calculation unit 30. The identity fraud probability is a probability that the target person of identity verification is fraudulently pretending to be the registered person. In other words, the identity fraud probability is a probability that at least one of the acquired biological information is not the biological information of the target person of identity verification, and is a false biological information resembling the registered person's biological information.

The identity fraud probability unit 38 calculates the identity fraud probability as described below, for example. It assumes that the jth acquired biological information of the n (n types of) acquired information from the target person of identity verification is biological information of fraudulently pretending, and assumes that this biological information of fraudulently pretending matches or roughly matches the biological information of the registered person. In this case, the identity fraud probability $h_j(s)$ related in the authentication scores $s=\{s_1, \ldots, s_n\}$ is derived by an equation (3).

$$h_j(s) = p(h) f_j(s_j) \prod_{\substack{i=1 \\ i \neq j}}^{n} g_i(s_i) \qquad (3)$$

In the equation (3), $f_j(s_j)$ represents the actual person probability distribution related in the authentication score $s_j$ corresponding to the jth acquired biological information. $g_i(s_i)$ (i=1, . . . , n, however, i=j is excluded) represents the others probability distribution corresponding to each authentication score $s_i$(i=1, . . . , n, however, i=j is excluded).

P(h) represents a prior probability of fraudulently pretending. This prior probability of fraudulently pretending is determined regarding the quality of biological information. For example, the prior probability of fraudulently pretending is set to be higher when the biological information quality is higher. The reason is, for example, in the case a face image or fingerprint information is utilized as biological information, when a high quality image, a high quality video or an elaborate fake finger is used as a fraudulently pretending face image or fingerprint information, the possibility of an erroneous authentication determination becomes higher.

The prior probability of fraudulently pretending P(h) is given by an equation (4), for example.

$$p(h) = \frac{p(g)}{1 + e^{-a \cdot \min q_i}} \qquad (4)$$

In the equation (4), "p(g)" represents the prior probability of others. "a" represents a positive constant that is appropriately set preliminarily. "$q_i$" represents the quality of the biological information, and "min $q_i$" represents its minimum value. "e" represents the base of the natural logarithm.

The determination unit 32 has a function to determine whether the authentication is OK utilizing the actual person probability f(s), the others probability g(s) and the identity fraud probability h(s) (h(s) is the maximum value among $h_j(s)$ (j=1, . . . , n)) calculated by the probability calculation unit 31.

For example, the determination unit 32 compares the probabilities f(s), g(s) and h(s), and extracts the highest probability. Then, when the actual person probability f(s) is the highest as defined by an equation (5), the determination unit 32 determines that the target person of identity verification is the registered person, and defines that authentication is OK (authenticated). In this case, the determination unit 32 outputs a signal value "1" representing the authentication is OK, for example. In the equation (5), "c" represents the authentication result.

$$c(f(s), g(s), h(s)) = \begin{cases} 1 & (f(s) > g(s) \text{ AND } f(s) > h(s)) \\ 0 & (g(s) \geq f(s) \text{ AND } g(s) > h(s)) \\ -1 & (h(s) \geq f(s) \text{ AND } h(s) \geq g(s)) \end{cases} \qquad (5)$$

When the others probability g(s) is the highest, the determination unit 32 determines that the target person of identity verification is not the registered person, and defines that the authentication is NG (cannot be authenticated). In this case, for example, the determination unit 32 outputs a signal value "0" representing the authentication is NG. Moreover, when the identity fraud probability h(s) is the highest, the determination unit 32 determines that the target person of identity verification is fraudulently pretending to be the registered person. In this case, for example, the determination unit 32 outputs a signal value "−1" representing an identity fraud.

Figure 3:
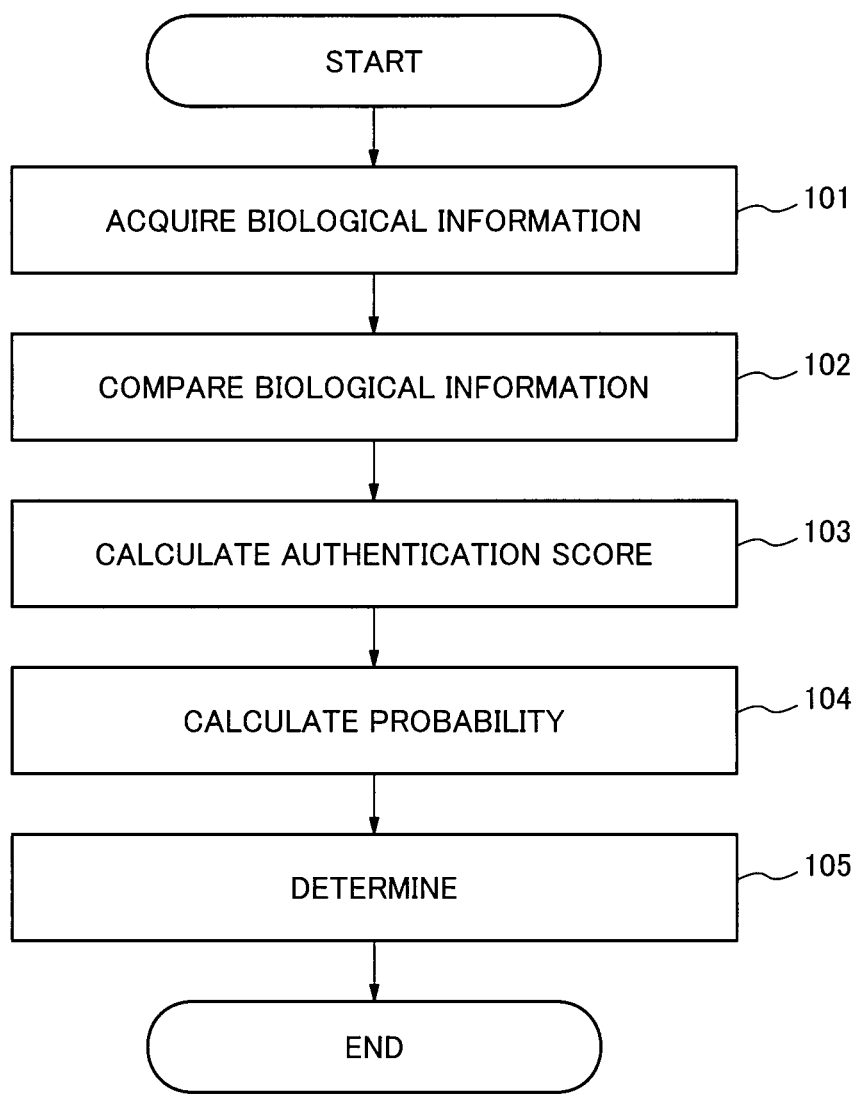
FIG. 3 is a flowchart showing an example of operation of the authentication device in the second exemplary embodiment.

The authentication device 20 of the second exemplary embodiment has the above configuration. An example of the operation of the authentication device 20 will be described with reference to the flowchart in FIG. 3. The flowchart in FIG. 3 illustrates a procedure of the program 24 executed by the control device 21 (processing unit 27) of the authentication device 20.

For example, when the authentication device 20 acquires the biological information (step 101), each score unit $35_{(1)}, \ldots, 35_{(n)}$ of the score calculation unit 30 in the control device 21 receives the related type of the acquired biological information. Then, each score unit $35_{(1)}, \ldots, 35_{(n)}$ compares the acquired biological information with the same type of the registered biological information 25 registered in the storage device 22 (step 102). Moreover, based on the result of the comparison, each score unit $35_{(1)}, \ldots, 35_{(n)}$ calculates the authentication score for each type of the acquired biological information (step 103).

Subsequently, the actual person probability unit 36 in the probability calculation unit 31 calculates the actual person probability f(s) based on the calculated authentication score and the equation (1). The others probability unit 37 calculates the others probability g(s) based on the calculated authentication score and the equation (2). Moreover, the identity fraud probability unit 38 calculates the identity fraud probability h(s) based on the calculated authentication score and the equation (3) (step 104).

Then, the determination unit 32 determines, based on the calculated probabilities f(s), g(s), h(s) and the equation (5), whether the target person of identity verification is the registered person (whether the authentication is OK or NG), or whether the target person of identity verification is fraudulently pretending to be the registered person.

As described above, the authentication device 20 of the second exemplary embodiment has a function to calculate the identity fraud probability explicitly (expressly), and perform the determination related to the authentication. Consequently, the authentication device 20 can suppress the problem that authentication precision decreases resulting from the identity fraud.

Figure 5:
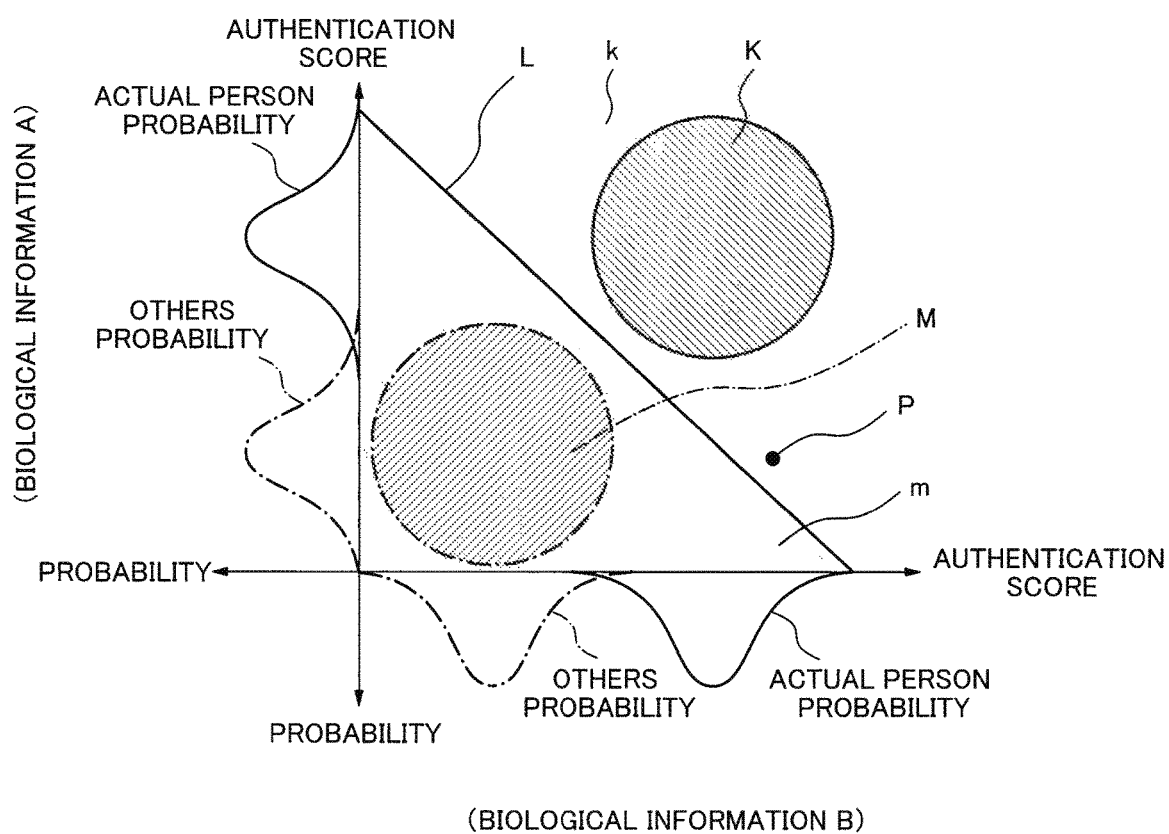
FIG. 5 is a figure describing with FIG. 4 the effect of the authentication device in the second exemplary embodiment.

That is, in the case the identity fraud probability is not taken into consideration, the following problem occurs. For example, it is assumed that the authentication (multimodal authentication) is carried out utilizing two types of biological information: biological information A and biological information B. In this case, it is assumed that the actual person probability distribution and the others probability distribution are evaluated preliminarily for each biological information A and B related in the authentication score, and that the threshold value L of the authentication score for determining the actual person or the others based on the evaluated actual person probability distribution and the others probability distribution is determined. In this case, the threshold value L is determined as the solid line L expressed in FIG. 5, for example. In the graph of FIG. 5, the target person of identity verification is determined as the actual person (authentication OK) when the coordinate position that is the combination of each authentication score of biological information A and B is located in the area k in a direction that the authentication score is greater than the threshold value L. The target person of identity verification is determined as the others, not the registered person (authentication NG) when the coordinate position that is the combination of each authentication score of biological information A and B is located in the area m in a direction that the authentication score is smaller than the threshold value L.

By the way, the area M in the area m expressed in the FIG. 5 is an area with a high probability that the target person of identity verification is not the registered person. The area K in the area k is an area with a high probability that the target person of identity verification is the registered person. In the case the coordinate position that is the combination of authentication score of biological information A and B is located in the area K, the reliability to the determination result that is authentication OK, is high. However, the area outside of the area K but inside the area k is an area that it is possible that the biological information A and B are biological information of fraudulently pretending. If the coordinate position that is the combination of each authentication score of biological information A and B (for example, position P expressed in FIG. 5) is located within this area, authentication is determined as OK even if the biological information is the biological information of fraudulently pretending (the target person of identity verification is fraudulently pretending to be the registered person). Therefore, there is a possibility of danger that the determination result is an erroneous determination.

Figure 4:
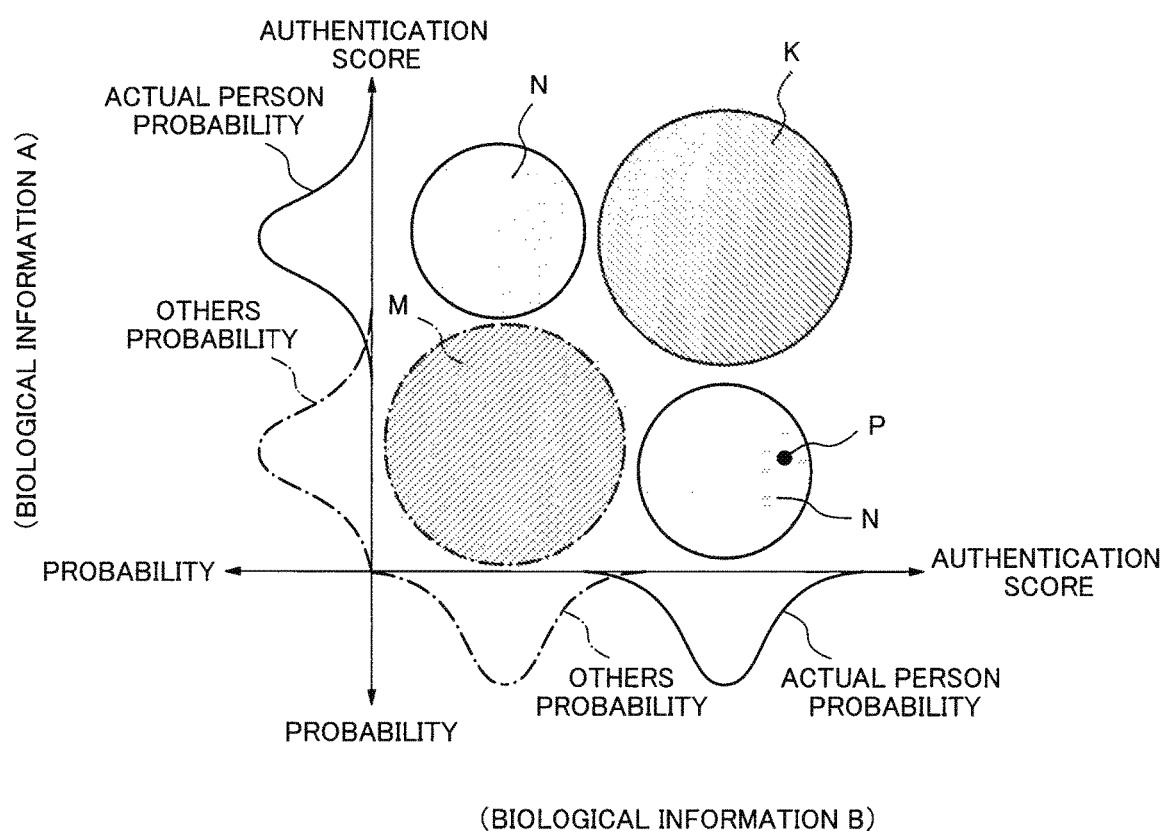
FIG. 4 is a figure describing an effect of the authentication device in the second exemplary embodiment.

Meanwhile, the authentication device 20 of the second exemplary embodiment carries out the determination related to the authentication taking the identity fraud probability into consideration. FIG. 4 is a diagram showing a relation between authentication scores for each biological information A and B and the determination result of authentication determination in this second exemplary embodiment. In this FIG. 4, an area K is the area that it is determined the authentication is OK. An area M is the area that it is determined as others (not an actual person), so the authentication is NG. An area N is the area that it is determined to be fraudulently pretending to be the registered person. A position P in the FIG. 5 is included in the area N in FIG. 4. Thus, in the determination related to the authentication based on the position P, the authentication device 20 of the second exemplary embodiment determines as the identity fraud, not as authentication OK. Therefore, the authentication device 20 of the second exemplary embodiment is capable of avoiding above mentioned erroneous determination caused by the identity fraud.

In this second exemplary embodiment, the authentication device 20 outputs a signal expressing the identity fraud in the case it determines as the identity fraud in the determination related to the authentication. Alternatively, in the case the authentication device 20 determines as the identity fraud, it may output a signal value "0" expressing the authentication is NG.

<Third Exemplary Embodiment>

A third exemplary embodiment related to the present invention will be described below. In the description of the third exemplary embodiment, same reference signs are given to portions that have the same names as the authentication device in the second exemplary embodiment, and the repeated description of the common portions is omitted.

Figure 6:
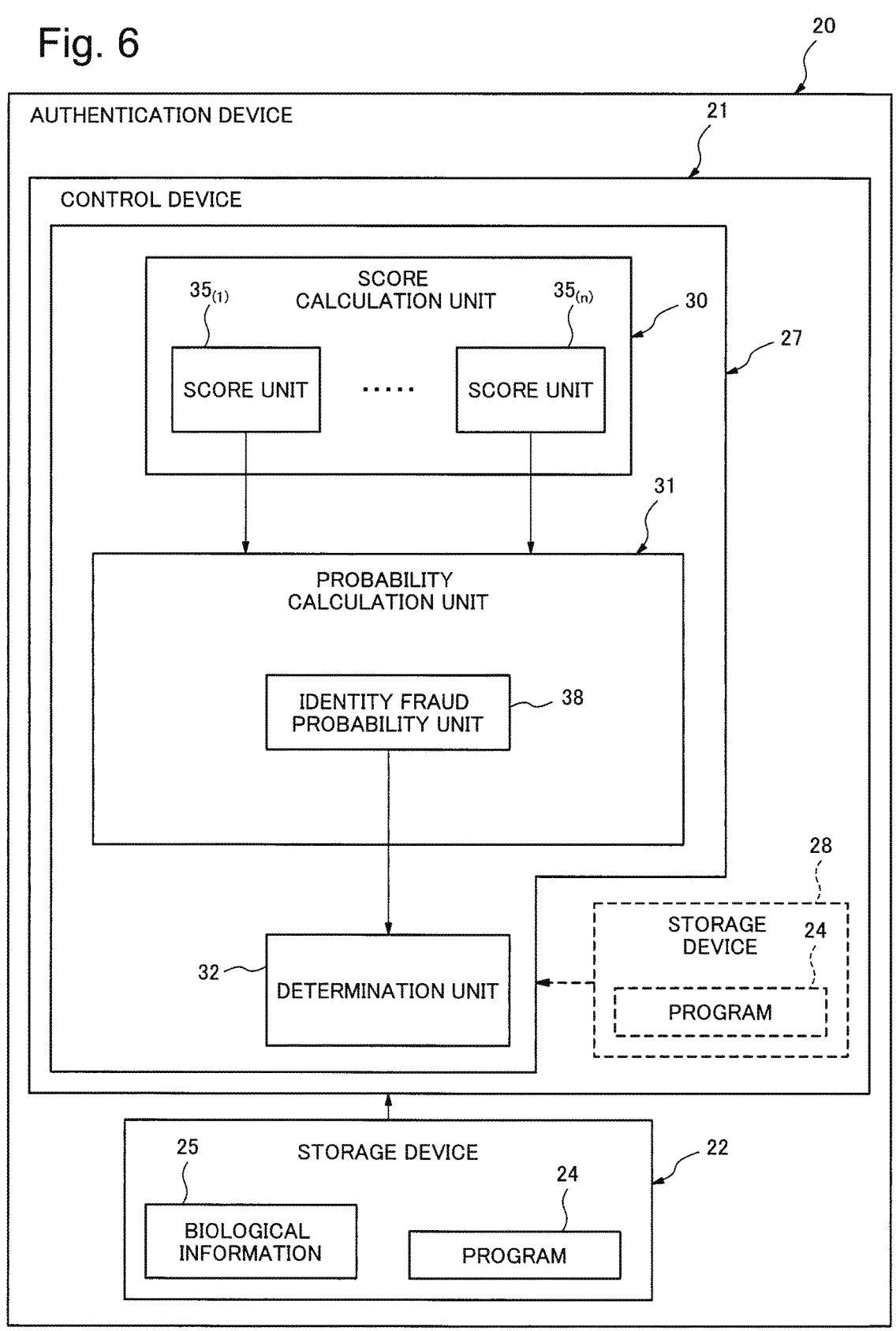
FIG. 6 is a block diagram showing in a simplified manner a configuration of an authentication device in a third exemplary embodiment related to the present invention.

FIG. 6 is a block diagram illustrating a configuration of an authentication device of the third exemplary embodiment in a simplified manner. The authentication device 20 of the third exemplary embodiment is a device to carry out an identity fraud determination. Therefore, in this third exemplary embodiment, the probability calculation unit (probability calculation means) 31 has an identity fraud probability unit 38, and the actual person probability unit 36 and the others probability unit 37 of the second exemplary embodiment are omitted. The identity fraud probability unit 38 has, similarly to the second exemplary embodiment, the function to calculate the identity fraud probability.

The determination unit 32 has the function to determine whether the target person of identity verification is fraudulently pretending to be the registered person based on the calculated identity fraud probability. For example, the determination unit 32 determines as the identity fraud when the calculated identity fraud probability is greater than a threshold old value.

In the authentication device 20 of the third exemplary embodiment, other configuration than the above-described probability calculation unit 31 and the determination unit 32, is the same as the second exemplary embodiment.

The authentication device 20 of the third exemplary embodiment has the function capable of determining whether being fraudulently pretended. Therefore, the authentication device 20, by being utilized with other authentication devices carrying out the multimodal authentication, can prevent the erroneous determination problem caused by the identity fraud.

<Other Exemplary Embodiments>

The present invention, without being limited to the first to the third exemplary embodiments, may take various embodiments. For example, in the second exemplary embodiment, the determination unit 32 carries out the determination related to the authentication based on the equation (5). The determination unit 32 can carry out the determination related to the authentication based on an equation (6), instead. "c" in the equation (6) represents the determination result.

$$c(f(s), g(s), h(s)) = \begin{cases} 1 & (f(s) > g(s) \text{ AND } h(s) < \theta) \\ 0 & (g(s) \geq f(s) \text{ AND } h(s) < \theta) \\ -1 & (h(s) \geq \theta) \end{cases} \quad (6)$$

Therefore, the determination unit 32 determines that, in the case the identity fraud probability h(s) is equal to or greater than the preliminarily determined fixed value θ, the target person of identity verification is fraudulently pretending to be the registered person, regardless of the values of the actual person probability f(s) and the others probability g(s).

The authentication device related to the present invention may be a device having a readout device to acquire the biological information, in addition to the control device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-035780, filed on Feb. 26, 2013, the disclosure of which is incorporated herein in its entirety by reference.

INDUSTRIAL APPLICABILITY

The present invention is effective in various fields utilizing the authentication technique, security fields for example.

REFERENCE SIGNS LIST 1, 20 Authentication device
2, 30 Score calculation unit
3, 31 Probability calculation unit
4, 32 Determination unit
7, 24 Program

The invention claimed is:

1. An authentication device comprising:
a processor executing instructions to:
compare multiple types of biological information acquired from a target person of identity verification as acquired biological information with the same type of registered biological information preliminarily registered and calculate an authentication score representing a degree of similarity between the acquired biological information and the registered biological information, for each type of the acquired biological information;
calculate, for each type of the acquired biological information, a probability that the target person of identity verification is fraudulently pretending to be the registered person who registered the registered biological information as an identity fraud probability, by utilizing the calculated authentication score; and
carry out at least one of a determination whether the target person of identity verification is the registered person and a determination whether the target person of identity verification is fraudulently pretending to be the registered person, utilizing the identity fraud probability.

2. The authentication device according to claim 1, wherein the processor
calculates, for each type of the acquired biological information, an identity fraud probability distribution expressing a relation between a probability that the target person of identity verification is fraudulently pretending to be the registered person and the authentication score, based on an actual person probability distribution expressing a relation between a probability that the target person of identity verification is the actual person as the registered person and the authentication score and based on a others probability distribution expressing a relation between a probability that the target person of identity verification is the others as the registered person and the authentication score, and
calculates the identity fraud probability for each type of the acquired biological information based on the identity fraud probability distribution.

3. The authentication device according to claim 1, wherein the processor further calculates, in addition to the authentication score, the identity fraud probability utilizing a quality information of the acquired biological information.

4. The authentication device according to claim 1, wherein the processor further calculates, based on the authentication score, an actual person probability that expresses a probability that the target person of identity verification is the identical person as the registered person, and an others probability that expresses a probability that the target person of identity verification is the others as the registered person, and
The processor determines whether the target person of identity verification is the registered person based on the calculated actual person probability, the others probability and the identity fraud probability.

5. The authentication device according to claim 4, wherein the processor determines that, when the identity fraud probability is equal to or greater than a threshold value, the target person of identity verification is fraudulently pretending to be the registered person regardless of the actual person probability or the others probability.

6. An authentication method comprising:
comparing multiple types of biological information acquired from a target person of identity verification as acquired biological information with the same type of registered biological information preliminarily registered;
calculating, for each type of the acquired biological information, an authentication score representing a degree of similarity between the acquired biological information and the registered biological information based on the comparison result;

calculating, for each type of the acquired biological information, a probability that the target person of identity verification is fraudulently pretending to be a registered person who registered the registered biological information as an identity fraud probability, utilizing the calculated authentication score; and carrying out at least one of a determination whether the target person of identity verification is the registered person and a determination whether the target person of identity verification is fraudulently pretending to be the registered person, utilizing the identity fraud probability.

7. A non-transitory computer-readable recording medium recorded with a program that causes a computer to execute:

a process of comparing multiple types of biological information acquired from a target person of identity verification as acquired biological information with same type of registered biological information preliminarily registered;

a process of calculating, for each type of the acquired biological information, an authentication score that represents a degree of similarity of the acquired biological information and the registered information based on the comparison result;

a process of calculating, for each type of the acquired biological information, a probability that the target person of identity verification is fraudulently pretending to be a registered person who registered the registered biological information as an identity fraud probability utilizing the authentication score; and a process of carrying out at least one of a determination whether the target person of identity verification is the registered person and a determination whether the target person of identity verification is fraudulently pretending to be the registered person, utilizing the identity fraud probability.

* * * * *